(12) United States Patent
Kortenkamp et al.

(10) Patent No.: US 10,013,266 B2
(45) Date of Patent: Jul. 3, 2018

(54) SYSTEM AND METHOD FOR EXECUTING OPERATIONS SPECIFIED IN A PROCEDURE LANGUAGE

(71) Applicant: TRACLabs, Inc., Webster, TX (US)

(72) Inventors: David Michael Kortenkamp, Seabrook, TX (US); Scott Edward Bell, Houston, TX (US)

(73) Assignee: TRACLABS, INC., Webster, TX (US)

( * ) Notice: Subject to any disclaimer, the term of this patent is extended or adjusted under 35 U.S.C. 154(b) by 1502 days.

(21) Appl. No.: 13/888,638

(22) Filed: May 7, 2013

(65) Prior Publication Data

US 2016/0162479 A1    Jun. 9, 2016

Related U.S. Application Data

(60) Provisional application No. 61/670,705, filed on Jul. 12, 2012.

(51) Int. Cl.
| | |
|---|---|
| *G06F 17/28* | (2006.01) |
| *G06F 3/0482* | (2013.01) |
| *G06F 3/0484* | (2013.01) |
| *G06F 9/455* | (2018.01) |
| *G06F 9/44* | (2018.01) |

(52) U.S. Cl.
CPC ............ *G06F 9/45516* (2013.01); *G06F 8/38* (2013.01); *G06F 9/4443* (2013.01)

(58) Field of Classification Search
CPC .............. G06F 17/2836; G06F 3/0482; G06F 3/04847; G06F 9/45516; G06F 8/38; G06F 9/4443

USPC .......................................................... 715/771
See application file for complete search history.

(56) References Cited

U.S. PATENT DOCUMENTS

| | | | | |
|---|---|---|---|---|
| 4,829,423 | A * | 5/1989 | Tennant ................ | G06F 3/0489 700/83 |
| 5,881,115 | A * | 3/1999 | Lipner ...................... | G06F 9/44 376/216 |
| 2002/0111965 | A1* | 8/2002 | Kutter ............... | G06F 17/30908 715/211 |
| 2005/0125079 | A1* | 6/2005 | Schreder ................ | G06Q 10/00 700/1 |
| 2007/0055491 | A1* | 3/2007 | Manson .............. | G06F 17/2785 704/9 |

(Continued)

OTHER PUBLICATIONS

Software assisted authoring and viewing of ISS crew procedures; Acta Astronautica 61(11-12):1053-1060 • Nov. 2007.*
Eclipe Usage Tutorial dated Feb. 13, 2008.*

*Primary Examiner* — John Repsher, III
(74) *Attorney, Agent, or Firm* — Oblon, McClelland, Maier & Neustadt, L.L.P.

(57) ABSTRACT

A system for executing a procedure includes a procedure execution engine. The procedure execution engine is configured to translate a procedure defined via a procedure language to natural language statements corresponding to the operations specified by the procedure language. The procedure execution engine is also configured to generate a user interface for controlling execution of the procedure, and to display the natural language statements via the user interface. The procedure execution engine is further configured to indicate progress of execution of the procedure, via the user interface, based on the displayed natural language statements.

25 Claims, 15 Drawing Sheets

(56) References Cited

U.S. PATENT DOCUMENTS

2007/0074180 A1\* 3/2007 Hinchey .................. G06F 8/10
717/136
2007/0226637 A1\* 9/2007 Yaseen .................. G06Q 10/00
715/762

\* cited by examiner

```
                        11:34 AM
                1.308 CDRS activation procedure
         ( Fail )  ( Skip )  ( Complete ) ( Automation ▼ ) ( Other ▼ )

Step 2. Check CO2 Valve Prerequisite            902
(Fri Jul 06 2012 11:34:28 GMT-0500 (CDT))
   ☑ CDRS Display:AR Rack:CDRS:CVV:CDRS Valve RT Status
     | CDRS Valve RT Status |

(Fri Jul 06 2012 11:34:32 GMT-0500 (CDT))
   ☑ cmd [CdrsCO2VentValve] CDRS CO2 Vent Valve Enable Command        | Issue |
(Fri Jul 06 2012 11:34:34 GMT-0500 (CDT))
   ☑ verify [CdrsCO2VentValve] CDRS CO2 Vent Valve RT Status Cmd      | Inh |
     Status = Ena
(Fri Jul 06 2012 11:34:42 GMT-0500 (CDT))
   ☑ cmd [CdrsCO2IsolationValve] CDRS CO2 Isolation Valve Enable      | Issue |
     Command                                      904
(Fri Jul 06 2012 11:34:44 GMT-0500 (CDT))
   ☑ verify [CdrsCO2IsolationValve] CO2 Isolation Valve Cmd Status = Ena  | Inh |

| PAX thinks this verify is incorrect (pax) - 11:34:42 AM CDT July 6, 2012 | ~906
End Step 2. Check CO2 Valve Prerequisite Step 3. Check CDRS Air Valve Prerequisite
     CDRS Display:AR Rack:CDRS:AV
     | CDRS Valve RT Status | cmd [CdrsAirInletValve] CDRS Air Inlet Enable Command            | Issue | verify [CdrsAirInletValve] CDRS Air Inlet Valve RT Status Cmd    | Inh |
     Status = Ena cmd [CdrsAirReturnValve] CDRS Air Return Enable Command          | Issue | verify [CdrsAirReturnValve] CDRS Air Return Valve RT Status Cmd  | Inh |
```

FIG. 9

SYSTEM AND METHOD FOR EXECUTING OPERATIONS SPECIFIED IN A PROCEDURE LANGUAGE

CROSS-REFERENCE TO RELATED APPLICATION

The present application claims priority to U.S. Provisional Patent Application No. 61/670,705, filed on Jul. 12, 2012 entitled "System and Method For Procedure Execution," which is hereby incorporated herein by reference in its entirety.

STATEMENT REGARDING FEDERALLY SPONSORED RESEARCH OR DEVELOPMENT

The invention was made with U.S. government support under Contract No. NNX10CA18C awarded by the National Aeronautic and Space Administration (NASA). The government has certain rights in the invention.

BACKGROUND

The knowledge needed to operate systems, both simple and complex, is often expressed in recorded procedures. Procedures describe the processes by which a device or system is operated, and are directed to achieving a task or goal relevant to the system. The information recorded in a procedure is generally derived from system experts and experience acquired as a system is operated over time. Complex systems, such as space vehicles, refineries, etc., may employ thousands of recorded procedures to ensure proper operation of the many facets of the system.

Procedures are conventionally recorded in natural language (i.e., natural human language, such as English) using word processing or text editing tools, and the recorded procedures are displayed via a static medium, such as paper. Alternatively, procedures may be electronically recorded, and presented on an electronic display for manual execution. Electronically recorded procedures are easily modified and, in cases where a large number of procedures are required, can be stored and accessed more conveniently than procedures recorded and/or presented on paper.

SUMMARY

Systems and methods for executing a procedure are disclosed herein. In one embodiment, a system for executing a procedure includes a procedure execution engine. The procedure execution engine is configured to translate a procedure defined using a procedure language to natural language statements corresponding to the operations specified by the procedure language. The procedure execution engine is also configured to generate a user interface for controlling execution of the procedure, and to display the natural language statements via the user interface. The procedure execution engine is further configured to indicate progress of execution of the procedure, via the user interface, based on the displayed natural language statements.

In other embodiments, a method for executing a procedure includes translating a procedure defined using a procedure language to natural language statements corresponding to the operations specified by the procedure language. A user interface for controlling execution of the procedure is generated. The natural language statements are displayed via the user interface. Progress of execution of the procedure is indicated, via the user interface, based on the displayed natural language statements.

In further embodiments, a computer-readable medium is encoded with instructions that when executed cause a processor to translate a procedure defined using a procedure language to natural language statements corresponding to the operations specified by the procedure. Additional instructions cause the processor to generate a user interface for controlling execution of the procedure, and to display the natural language statements via the user interface. Further instructions cause the processor to indicate progress of execution of the procedure, via the user interface, based on the displayed natural language statements.

BRIEF DESCRIPTION OF THE DRAWINGS

For a detailed description of exemplary embodiments of the invention, reference will now be made to the accompanying drawings in which:

FIG. 9 shows an illustrative display generated by a procedure execution station while manually executing a procedure in oversight mode in accordance with various embodiments;

NOTATION AND NOMENCLATURE

Figure 1:
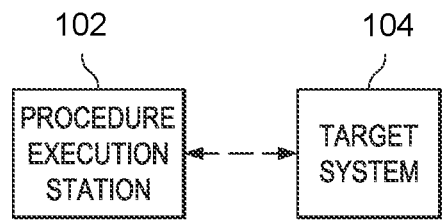
FIG. 1 shows a block diagram of procedure-based system control in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

While manual execution of procedures recorded in natural language has proven to be a generally successful paradigm for goal achievement in complex systems, such conventional practice is not without difficulties. Procedures can be long and complex, which may make execution time-consuming and prone to error. Additionally, verification of proper execution can be problematic. Automation of procedures alleviates some of the difficulties of manual execution, but raises new issues with regard to translation of natural language to computer language, and verification of automated execution.

Embodiments of the present disclosure encode procedures in a procedure language, such as procedure representation language (PRL), rather than in natural language. The PRL encoded procedure may be translated into natural language for display and/or manual execution, and/or may be directly executed by a procedure automation engine. Thus, embodiments avoid issues with verification of computer language encoded procedures and provide increased execution speed and reduction or elimination of human error in execution. Embodiments also provide logging of procedure execution and all operations performed in conjunction therewith, allowing for concurrent and/or post-execution review of manual and automated procedure execution.

A PRL encoded procedure may include a unique identifier and local variables, and may receive parameters passed at run-time. One or more steps form the body of a procedure, where each step is directed to accomplishing a goal within the procedure. Each step can end in one of three ways: 1) a conditional branch in which Boolean expressions are paired with step identifiers and execution branches to the first step whose Boolean expression evaluates to TRUE; 2) a "goto" step in which execution continues at the step identified in the "goto"-step; and 3) an exit procedure in which execution ends. Each step can have Automation Data controlling its execution. Each step has as its body one or more blocks.

Blocks contain the instructions necessary to accomplish the step. The most basic block is an Ordered Block, which contains one or more instructions that are executed one after the other. An Unordered Block contains one or more instructions that can be executed in any order. Other block constructs offer control over execution flow such as if-then, repeat-until and while. Each block contains another block or a group of instructions.

Instructions are the atomic actions of PRL. PRL includes a wide variety of instructions that may be applied to different systems. A COMMAND Instruction issues a computer command (possibly with parameters) to the underlying system. A VERIFY Instruction compares a specific system status value to a target value. If the comparison is TRUE the instruction succeeds and execution continues. If the comparison is FALSE then execution halts and the procedure fails. A WAIT Instruction halts execution either for a specified period of time or until a Boolean expression becomes TRUE. The CALL PROCEDURE Instruction calls another procedure using the procedure identifier associated with the instruction and passes any required parameters. Each instruction can also have Automation Data that controls its execution.

Automation Data is used to control execution in PRL. Automation Data includes a pair of gating conditions called PreConditions and PostConditions, which are Boolean expressions that must evaluate to TRUE before execution of the procedure, step or instruction begins and after execution ends or the procedure execution fails. Automation Data also includes a pair of wait conditions called StartConditions and EndConditions, which are also Boolean expressions that must evaluate to TRUE before execution can begin and end. If wait conditions evaluate to FALSE then execution waits until they become TRUE. Automation Data also includes InvariantConditions, which are Boolean expressions that must remain TRUE throughout execution of the procedure, step or instruction, or execution fails. Automation Data may also include a description of the resources necessary to execute the procedure, step or instruction. Automation Data can apply at the procedure, step or instruction level.

FIG. 1 shows a block diagram of procedure-based system control in accordance with various embodiments. In FIG. 1, a procedure execution station 102 is coupled to a target system 104. Because procedure-based control is applicable to a wide variety of different systems and devices, the target system 104 may encompass any system or device whose operation may be directed via a procedure. For example, the manipulated system may a hydrocarbon drilling or production system, a chemical plant, a space vehicle, a marine vessel, or any other system or apparatus amenable to procedural manipulation.

The procedure execution station 102 is coupled to the target system 104. In some embodiments, the procedure execution station 102 may be an access terminal of (e.g., integrated into) the target system 104. In other embodiments, the procedure execution station 102 may be a computing device such as a desktop computer, a laptop computer, a rackmount computer, a tablet computer, etc. coupled to the target system 104. The procedure execution station 102 may be coupled to the target system 104, for example, by a standard-based wired and/or wireless network as known in the art (e.g., a network in accordance with IEEE 802.3, 802.11, etc.), or via a proprietary connection.

Figure 2:
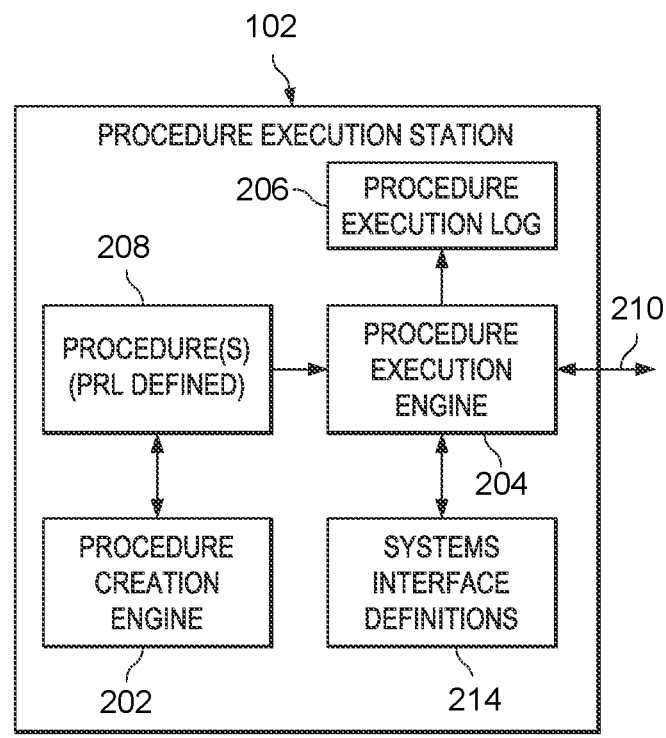
FIG. 2 shows a block diagram of a procedure execution station in accordance with various embodiments.
Figure 5:
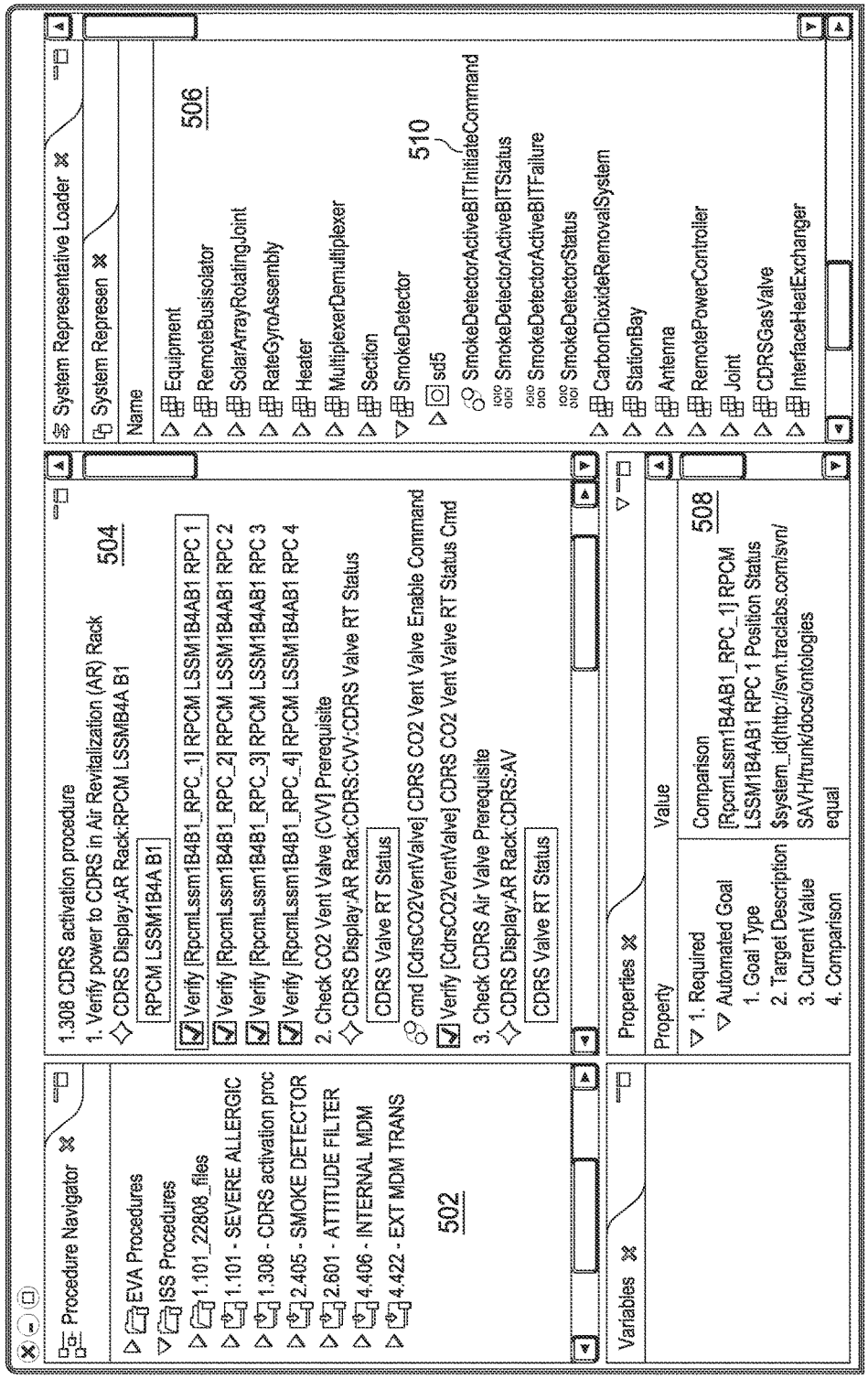
FIG. 5 shows an illustrative user interface display provided by a procedure creation engine in accordance with various embodiments.

FIG. 2 shows a block diagram of the procedure execution station 102 in accordance with various embodiments. Embodiments of the procedure execution station 102 may include a procedure creation engine 202, and/or a procedure execution engine 204. The procedure creation engine 202 provides tools for generating procedures 208 in a procedure language, such as PRL. For example, the procedure creation engine 202 may provide a user interface (e.g., a graphical user interface) that allows drag and drop editing of PRL language constructs for crafting a procedure in PRL. FIG. 5 shows an illustrative user interface display provided by the procedure creation engine 202. Previously created procedures are listed in pane 502. The procedure under construction is shown in pane 504. Interface definitions relevant to the target system 104 are shown in pane 506. Instruction properties are shown in pane 508. Instructions may be inserted into the procedure under construction by dragging and dropping. For example, the command 510 may be dragged into the procedure under construction in pane 504 and dropped at a desired position.

The procedure execution engine 204 provides manual and automated execution of procedures 208 defined in a procedure language such as PRL. In executing a procedure 208, the procedure execution engine 204 may convert the operations specified by the PRL statements of the procedure to natural language and display the natural language procedure statements on a display device for viewing and/or execution by an operator. The procedure execution engine 204 may also execute the PRL statements. The procedure execution engine 204 may be configured to interpretively execute the PRL statements of a procedure without intermediate translation from PRL to a different procedure execution language. Direct generation of natural language statements from PRL and direct execution of PRL allows for generating commands and verifying state information of the target system 104 while reducing the likelihood that automated execution fails to correspond to the operations specified by the natural language statements. For example, in a procedure execution system that provides separate natural language statements and statements for execution (e.g., computer language statements), the possibility exists that the automated execution statements fail to accurately represent the operations defined by the natural language statements. As a consequence, automated execution of the procedure may be in error, and because the error is not reflected in the natural language statements the error may be difficult to identify. Embodiments of the procedure execution engine 204 avoid this difficulty by generating natural language procedure statements from PRL and directly executing PRL.

The system interface definitions 214 provide the procedure execution engine 204 with information regarding the communication structures of the target system 104. For example, the system interface definitions 214 may specify the command and status information available for use with the target system 104, and the syntax and/or formatting of the commands and status. For example, for a command the system interface definitions 214 may specify a command identifier, operational nomenclature, command arguments, data types of the arguments, a component of the target system 104 to which the command is directed or which is manipulated via the command, etc. Similarly, for a status value the system interface definitions 214 may specify a status ID, nomenclature, data type, a system component associated with the status value, etc. The procedure execution engine 204 references the system interface definitions 214 while executing a PRL procedure 208 and generates commands to and retrieves status from the target system 104 as specified by the PRL statements. The procedure execution engine references the system interface definitions 214 to determine the structure and parameters of each command transmitted to and status value retrieved from the target system 104.

The procedure execution engine 204 stores status and other information relevant to the execution of the procedure in a procedure execution log 206. For example, the procedure execution engine 204 may store information indicative of all user operations with regard to procedure execution, all status of the target system 104 accessed as a result of procedure execution, all commands sent to the target system 104, etc. In some embodiments, the procedure execution log 206, the system interface definitions 208, and/or the procedures 208 may be stored remote from the procedure execution station 102 and accessed via a communication network, such as a wired or wireless network, the internet, etc.

Figure 3:
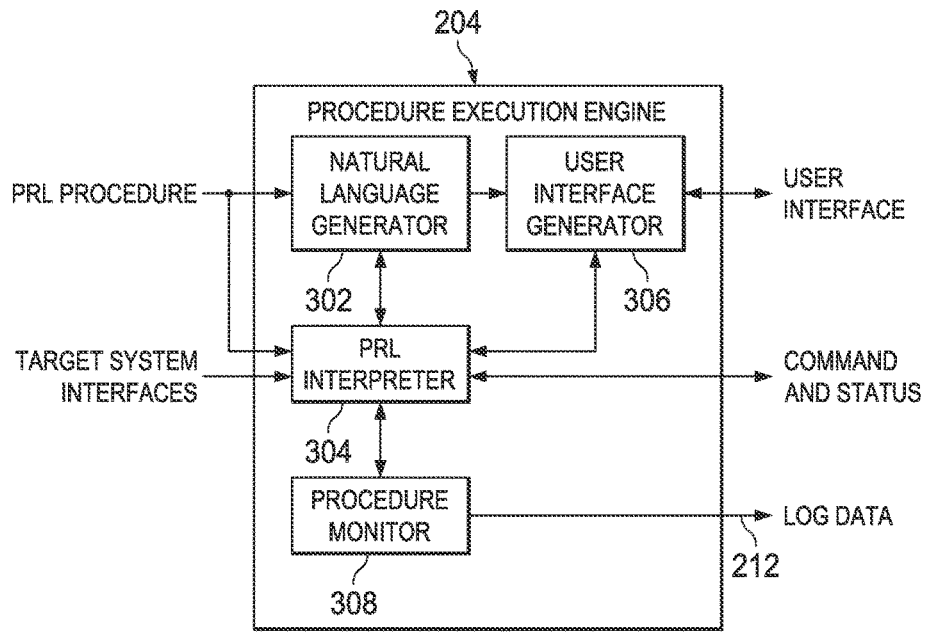
FIG. 3 shows a block diagram of a procedure execution engine in accordance with various embodiments.

FIG. 3 shows a block diagram of the procedure execution engine 204. The procedure execution engine 204 includes a natural language generator 302, a PRL interpreter 304, a user interface generator 306, and a procedure monitor 308. The natural language generator 302 parses statements of the PRL procedure being executed, and generates therefrom text of natural language statements corresponding to the PRL statements. The natural language generator 302 provides the natural language statements to the user interface generator 306, which generates a user interface display including the natural language statements on a display device, such as a liquid crystal display panel or other display device.

The PRL interpreter 304 executes the PRL statements of the procedure being executed. The PRL statements are not translated to statements of any other procedure or scripting language prior to execution. The PRL interpreter 304 generates commands to and retrieves status from the target system 104 in accordance with the PRL statements executed and target system interface definitions. The PRL interpreter 304 provides target system command and status information, procedure execution progress information, etc. to the user interface generator 306, which incorporates the information into a user interface display (e.g., a display including the natural language statements generated by the natural language generator 302) presented on a display device. For example, a status value retrieved from the target system 104 through automated execution of a PRL statement may be displayed (at the time of retrieval) proximate to or in conjunction with a natural language statement derived from the PRL statement.

The procedure monitor 308 gathers information relevant to the execution of the PRL procedure, such as user interaction with the user interface, timing of PRL statement execution, commands issued, status retrieved, etc., and provides the information to the procedure execution log 206. The procedure monitor 308 monitors both manual and automated procedure execution. Embodiments of the procedure monitor 308 may also provide procedure execution status 212 to external systems. For example, procedure execution status 212 may be provided to systems (e.g., computing devices) that provide remote monitoring or logging of procedure execution.

As explained herein, the procedure execution engine 204 allows manual and/or automated execution of PRL procedures 208. Selection of manual or automated execution may be provided via a procedure execution user interface. In manual mode, all procedure operations are performed and marked as completed by the operator. Thus, the operator is ultimately responsible for proper procedure execution in manual mode. The natural language procedure display may include a command initiation button for each command to be issued in conjunction with a procedure statement, and a procedure statement correspondent display of status retrieved. Thus, if a command instruction requires that an operator send a particular command, the procedure display provides a button to initiate command transmission. The command may be sent only if the operator clicks the command button. Manual execution allows operators to perform procedures in a fashion similar to conventional execution. All decisions are made by the operator with the procedure execution engine 204 providing some support (e.g., command transmission on user selection). Procedure performance using manual execution is enhanced by embedding status retrieval and command execution in the procedure.

Figure 6:
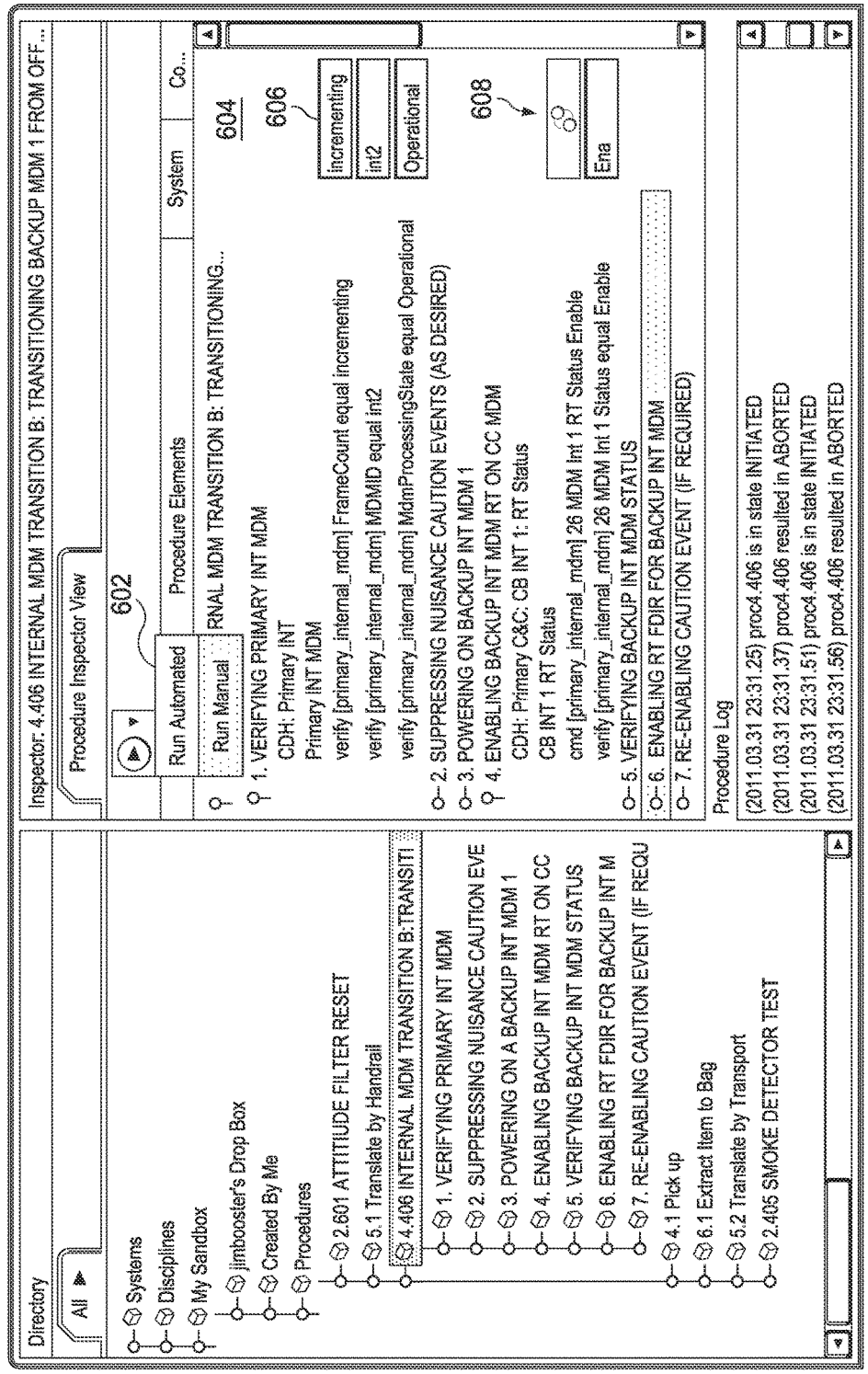
FIG. 6 shows an illustrative display generated by a procedure execution station for manually executing a procedure in accordance with various embodiments.

FIG. 6 shows an illustrative display generated by the procedure execution station 102 while manually executing a procedure. A drop-down menu 602 for selection of manual or automatic procedure execution is provided. Natural language statements of the procedure are displayed in pane 604. Status 606 retrieved from the target system 104 is displayed in conjunction with the corresponding natural language statements. Buttons 608 are provided to allow the operator to transmit an indicated command to the target system 104.

The procedure execution engine 204 provides a "bookmark" indicating a current place of execution in the procedure. Via the procedure execution user interface, the operator may move the marker to any statement in the procedure. Status verification statements in a procedure will be executed by procedure execution engine 204, and marked if the status verification fails. In manual execution, the operator, however, is still ultimately responsible for performing the status check and marking the instruction as executed. For example, a "Verify UNIT ID—INT 2" instruction" would be visually verified by the operator. If the "UNIT ID" status was not "INT 2", the procedure execution engine 204 would mark the instruction red. The operator would then set the instruction as "FAILED" by clicking the instruction and selecting "Mark as failed". If the "UNIT ID" status was correct, the procedure execution engine 204 would mark the instruction green. The operator would then click the button "Mark as completed and continue to next step"

If automated procedure execution is selected, each instruction is automatically executed by the procedure execution engine 204. Commands and status are automatically issued and checked respectively. The procedure execution engine 204 can detect error conditions that are described in the procedure, halt execution, and mark the problematic instruction and the procedure as failed. Error conditions include, for example, commands that fail to send, out of bounds status values, etc.

Figure 7:
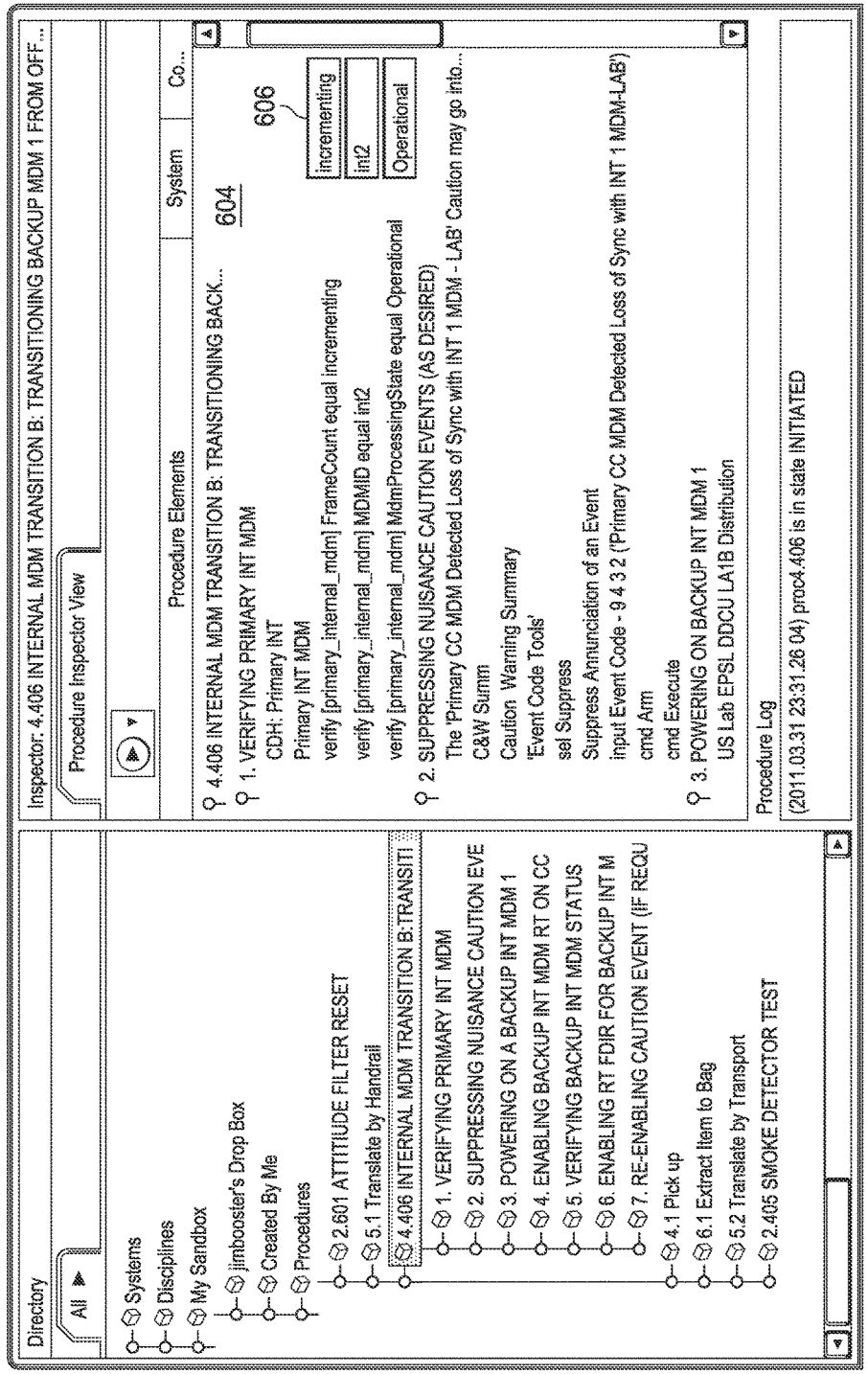
FIG. 7 shows an illustrative display generated by a procedure execution station for automatically executing a procedure in accordance with various embodiments.

FIG. 7 shows an illustrative display generated by the procedure execution station 102 while automatically executing a procedure. Natural language statements of the procedure are displayed in pane 604. Status 606 retrieved from the target system 104 is displayed in conjunction with the corresponding natural language statements.

Figure 8:
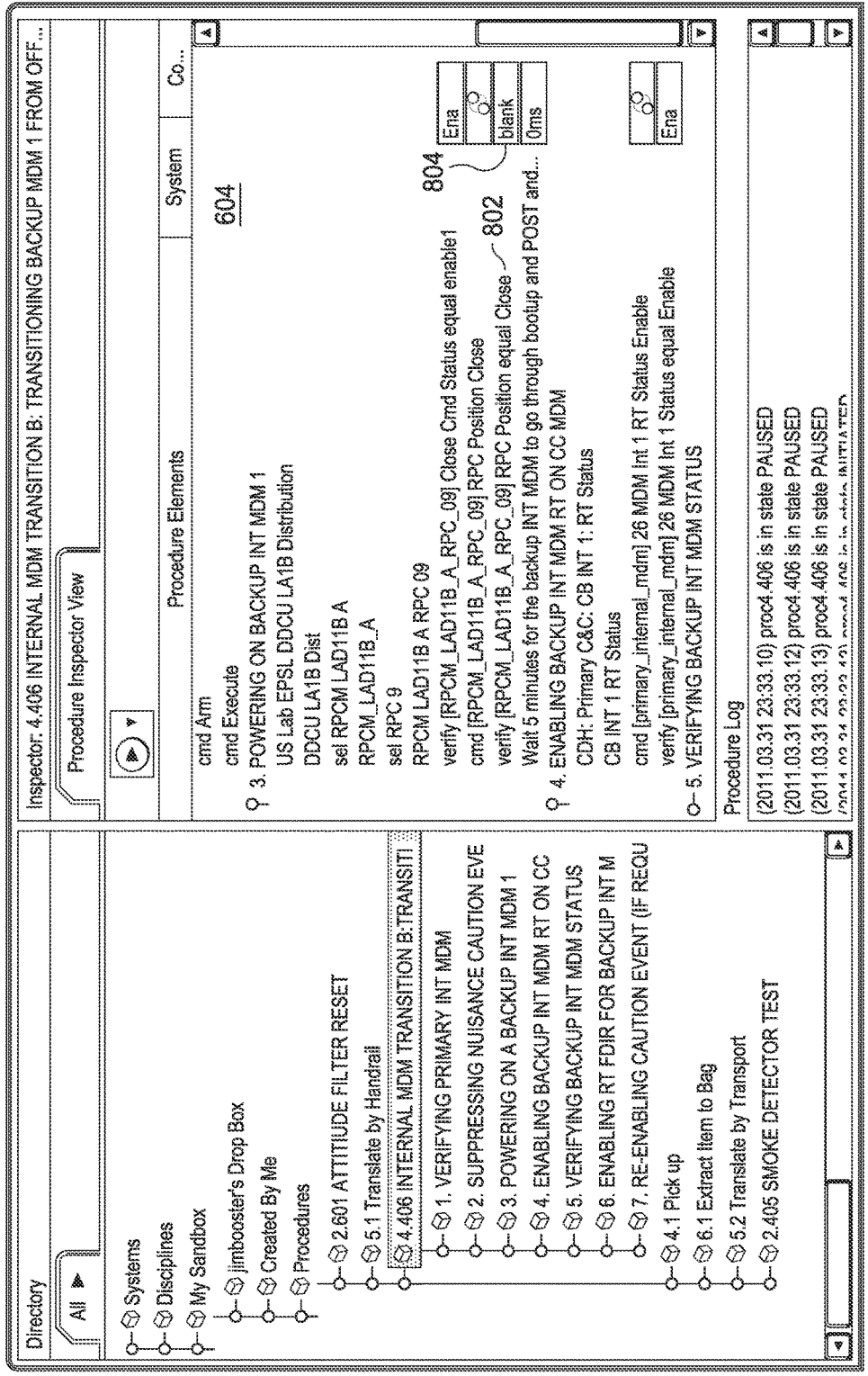
FIG. 8 shows an illustrative display generated by a procedure execution station for an error detected while automatically executing a procedure in accordance with various embodiments.

FIG. 8 shows an illustrative display generated by the procedure execution station 102 when an error is detected while automatically executing a procedure. Natural language statements of the procedure are displayed in pane 604. Statement 802 is marked as subject to an error (e.g., colored red) detected during automatic execution of the PRL corresponding to the statement. Status 804 associated with the statement 802 is displayed.

To enhance manual procedure execution, the procedure execution engine 204 provides an oversight mode in which the procedure execution engine 204 monitors manual execution of a procedure and provides assistance or feedback to the operator. In oversight mode the procedure execution engine 204 applies a set of heuristics or rules to monitor execution. If a heuristic is triggered, the procedure execution engine 204 displays, as an annotation to the natural language procedure display, information relevant to the heuristic as applied to the procedure operation. Illustrative heuristics applied in oversight mode may relate to:

Out of order execution,
Inordinately long instruction/step execution time,
Improper instruction execution, etc.

FIG. 9 shows an illustrative display generated by the procedure execution station 102 while manually executing a procedure in oversight mode. Natural language statements 902 of the procedure are displayed. In FIG. 9, an operator has marked an instruction 904 as complete even though the status retrieved by a verify instruction is incorrect. The procedure execution engine 204 is operating in oversight mode and provides a message 906 indicative of the potential problem.

Figure 10:
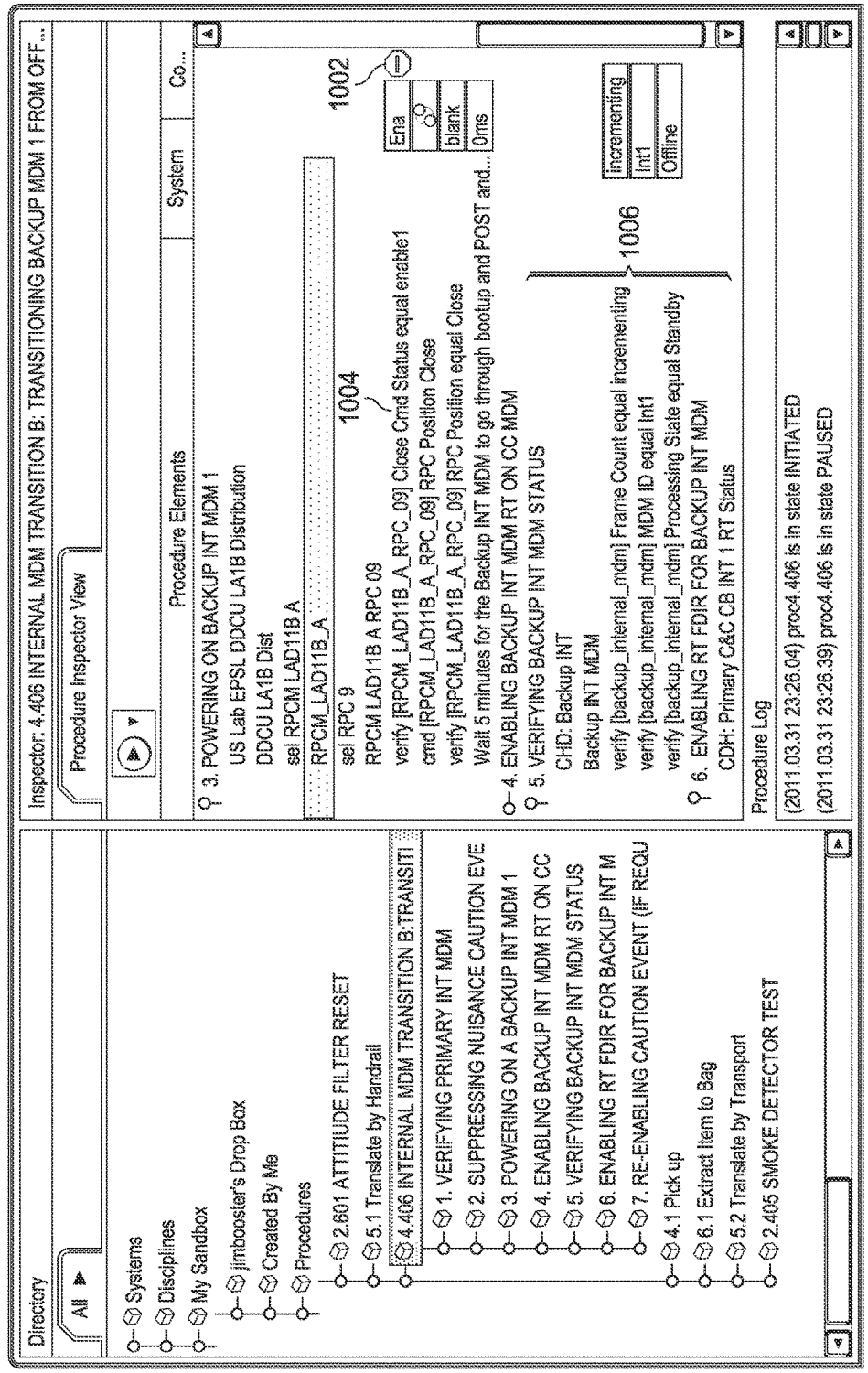
FIG. 10 shows an illustrative display generated by a procedure execution station that includes a breakpoint in accordance with various embodiments.

Because automated procedure execution is a significant departure from conventional practice, the procedure execution engine 204 provides the operator with various features that allow the operator to control automated procedure execution. For example, the procedure execution engine 204 may provide breakpoint and/or skipping features. Breakpoints can be inserted into the natural language statements of a procedure at any location. Breakpoints cause the procedure execution engine 204 not to proceed with autonomous execution until an operator gives consent. Breakpoints may be created by simply right-clicking on a natural language procedure statement and selecting a breakpoint. A breakpoint may appear as a small stop sign in the procedure display. Note that setting a breakpoint at every instruction in the procedure is not equivalent to manual execution. Even with breakpoints, the procedure execution engine 204 automatically verifies status and issues commands, which is not the case in manual mode. Breakpoints do allow operators to ensure that the context for the procedure is still valid. FIG. 10 shows an illustrative display generated by the procedure execution station 102 that includes a breakpoint 1002 for halting automatic procedure execution at natural language statement 1004.

Skipping allows the operator to mark specific statements in the procedure to be not executed. The procedure execution engine 204 will then skip those statements in automated mode. The notations do not affect the underlying PRL, which remains intact. The procedure execution engine 204 may also provide one or more shorthand skipping controls that provide simplified control over procedure execution. For example, the procedure execution engine 204 can start from a specific point in the procedure (equivalent to skipping the prior instructions). The procedure execution engine 204 can also execute only parts of the procedure (equivalent to skipping all other parts). The procedure execution engine 204 can also restart the procedure at a specific point after it has been stopped, paused, or detected a failure condition. Such operation may be used, for example, to resend a command that has failed. Additionally, the procedure execution engine 204 can be configured to consider specific instructions already completed. In FIG. 10, an operator has marked natural language statements 1006 to be skipped. Consequently, PRL associated with natural language statements 1006 will not be executed by the procedure execution engine 204.

Figure 4:
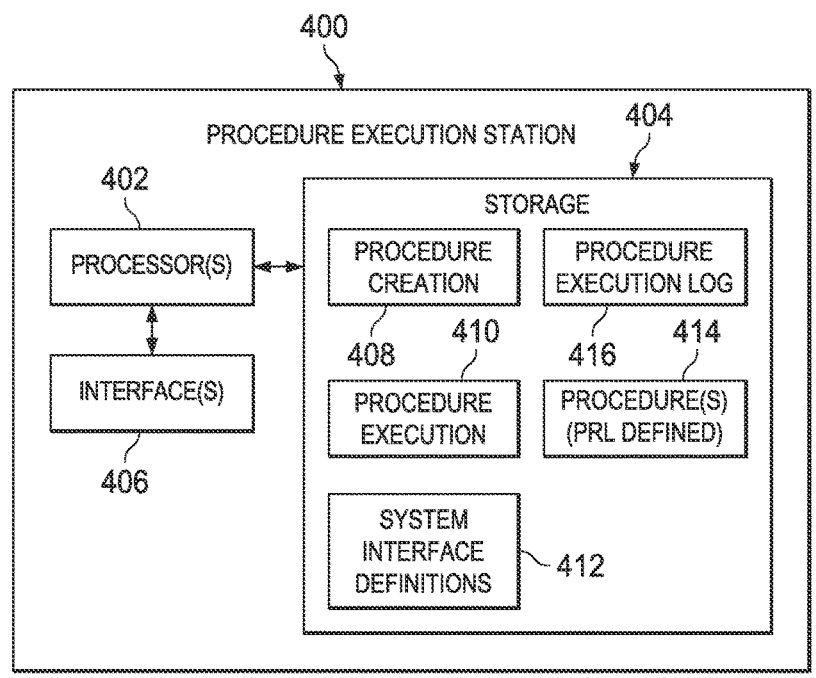
FIG. 4 shows a block diagram of a processor-based procedure execution station in accordance with various embodiments.

The procedure creation engine 202 and the procedure execution engine 204 comprise hardware (e.g., a processor) and software instructions that conjunctively perform the various functions disclosed herein. At least some embodiments of the procedure creation engine 202 and the procedure execution engine 204 may be implemented as a processor executing instructions that cause the processor to perform the functions disclosed herein. FIG. 4 shows a block diagram of procedure execution station 400 that includes processor(s) 402 that implement the functionality of one or more of the procedure creation engine 202 and the procedure execution engine 204. The procedure execution station 400 is an implementation of the procedure execution station 102. The processor(s) 402 may include a general-purpose microprocessor, digital signal processor, microcontroller, or other device configured to execute instructions for performing operations disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 404 is coupled to the processor(s) 402, and stores software programming (i.e., processor executable instructions) that the processor(s) 402 executes to perform the procedure creation and/or procedure execution operations disclosed herein. The storage 404 is a non-transitory computer-readable storage medium. A computer-readable storage medium may include volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

The storage 404 includes a procedure creation module 408 and a procedure execution module 410. The procedure creation module 408 includes instructions that when executed cause the processor(s) 402 to perform the procedure creation operations disclosed herein. For example, the instructions of the procedure creation module 408 may cause the processor(s) 402 to generate a procedure creation user interface on a display device, wherein the procedure creation user interface allows a user to enter a procedure in PRL by dragging and dropping procedure instruction objects, system interface objects, etc. into a procedure.

The procedure execution module 410 includes instructions that when executed cause the processor(s) 402 to perform the procedure execution operations disclosed herein. For example, the instructions of the procedure execution module 410 may cause the processor(s) 402 to generate a procedure execution user interface on a display device, and to selectively provide manual or automated execution of a PRL defined procedure.

The interface(s) 406 are coupled to the processor(s) 406. The interface(s) include the various communication interfaces through which the procedure execution station 400 communicates with the target system 104 and other devices. For example, the interface(s) 402 may include a display interface through which the procedure execution station 400 communicates information to a display device, such as flat panel liquid crystal display or other suitable display device. The interface(s) 402 may include a user input interface through which an operator provides input to the procedure execution station 400 (e.g., universal serial bus interfaces). The interface(s) 402 may further include proprietary interfaces or network adapters (e.g., IEEE 802.11, IEEE 802.3, wide area networks, etc.) through which the procedure execution station 400 communicates with other computing devices and/or the target system 104.

Some embodiments of the procedure execution station 400 may be implemented using a desktop computer, a laptop computer, a rackmount computer, a tablet computer, a server computer, or other suitable computing device.

Figure 11:
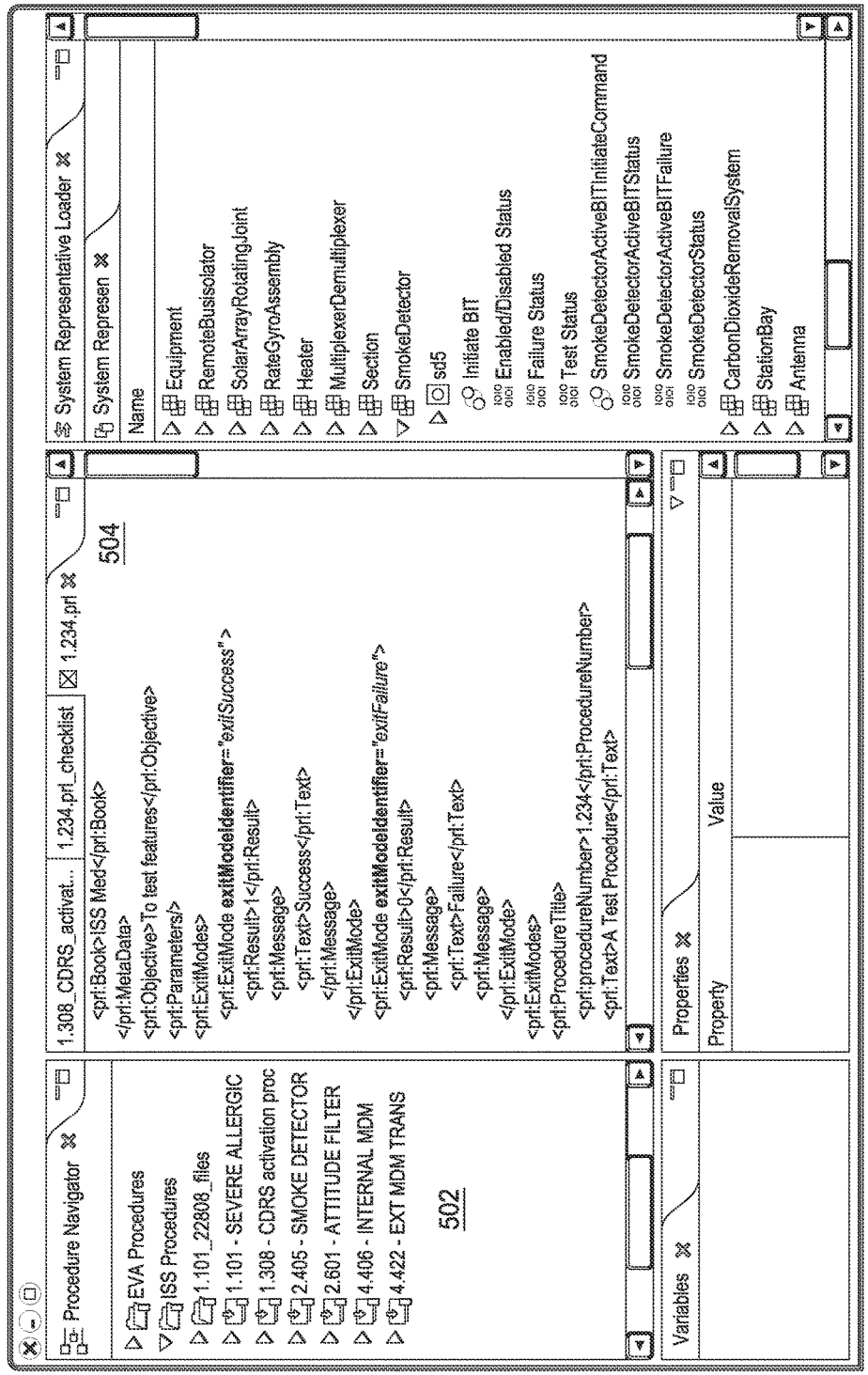
FIG. 11 shows an illustrative display generated by a procedure creation engine showing procedure language in accordance with various embodiments.

FIG. 11 shows an illustrative display generated by the procedure creation engine 202. The display of FIG. 11 corresponds to the display of FIG. 5. However, in FIG. 11, rather than the natural language statements shown in FIG. 5, PRL corresponding to the natural language statements of FIG. 5 is displayed in pane 504.

Figure 12:
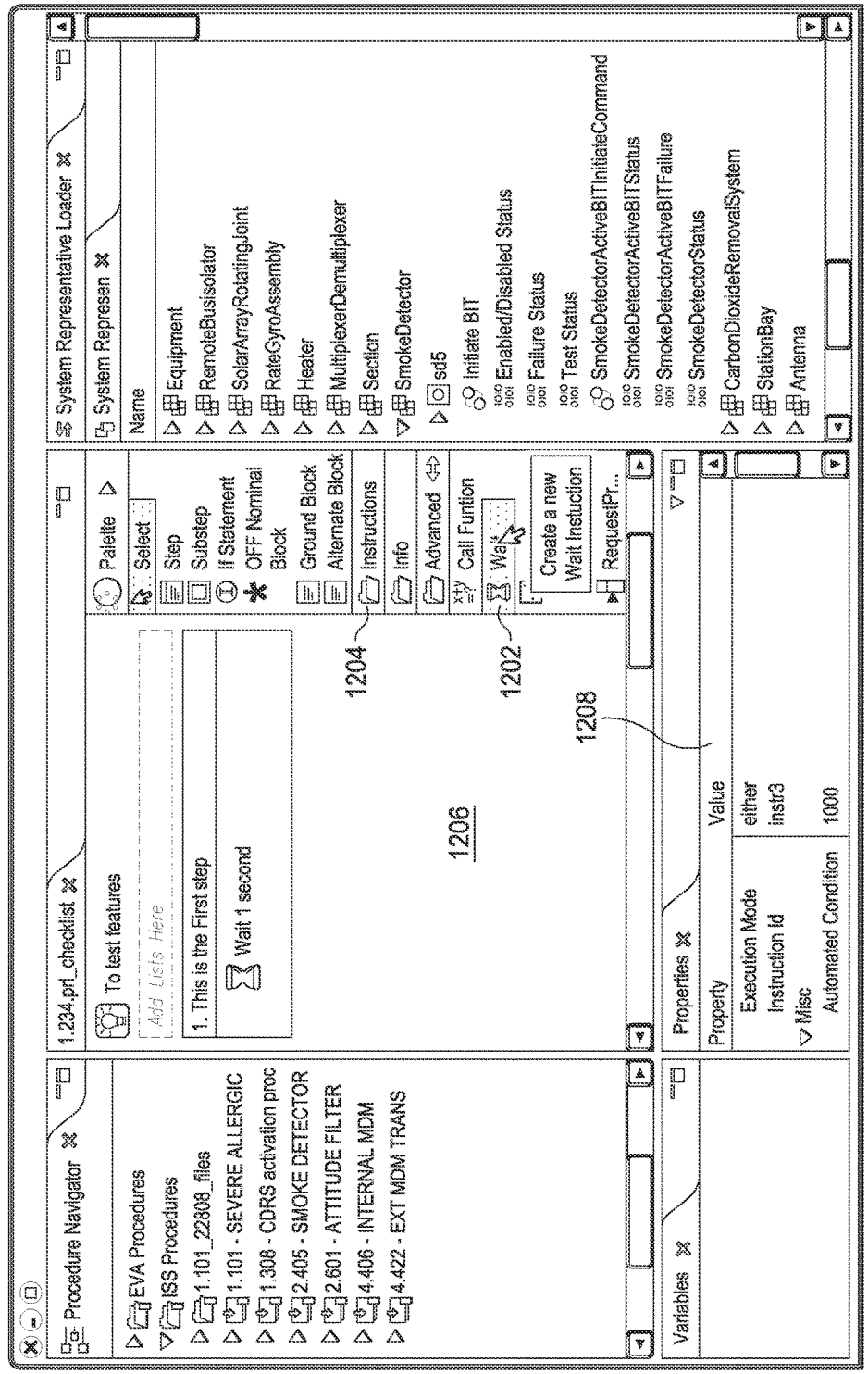
FIG. 12 illustrates insertion of a WAIT instruction in a procedure via a procedure creation engine in accordance with various embodiments.

FIG. 12 illustrates insertion of a WAIT instruction in a procedure via the procedure creation engine 202. In the user interface of FIG. 12, a WAIT instruction 1202 is selected from the instruction menu 1204, and dragged and dropped into the procedure being created in pane 1206. The user provides a specified wait time for the instruction by entering a numeric wait time value in the property pane 1208. The procedure creation engine 202 may generate PRL corresponding to the WAIT instruction with a 1000 millisecond wait time as follows:

```
<prl:WaitInstruction instructionIdentifier="instr3" timeout="1000">
  </prl:WaitInstruction>
```

Figure 13:
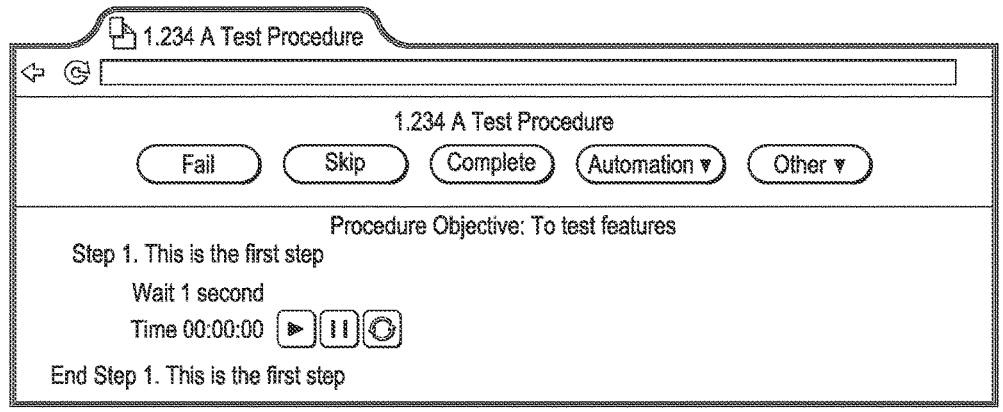
FIG. 13 shows natural language statements generated by a procedure execution engine from a procedure language WAIT Instruction in accordance with various embodiments.

FIG. 13 shows the natural language statements generated and displayed by the procedure execution engine 204 from the WAIT Instruction PRL shown above.

Figure 14:
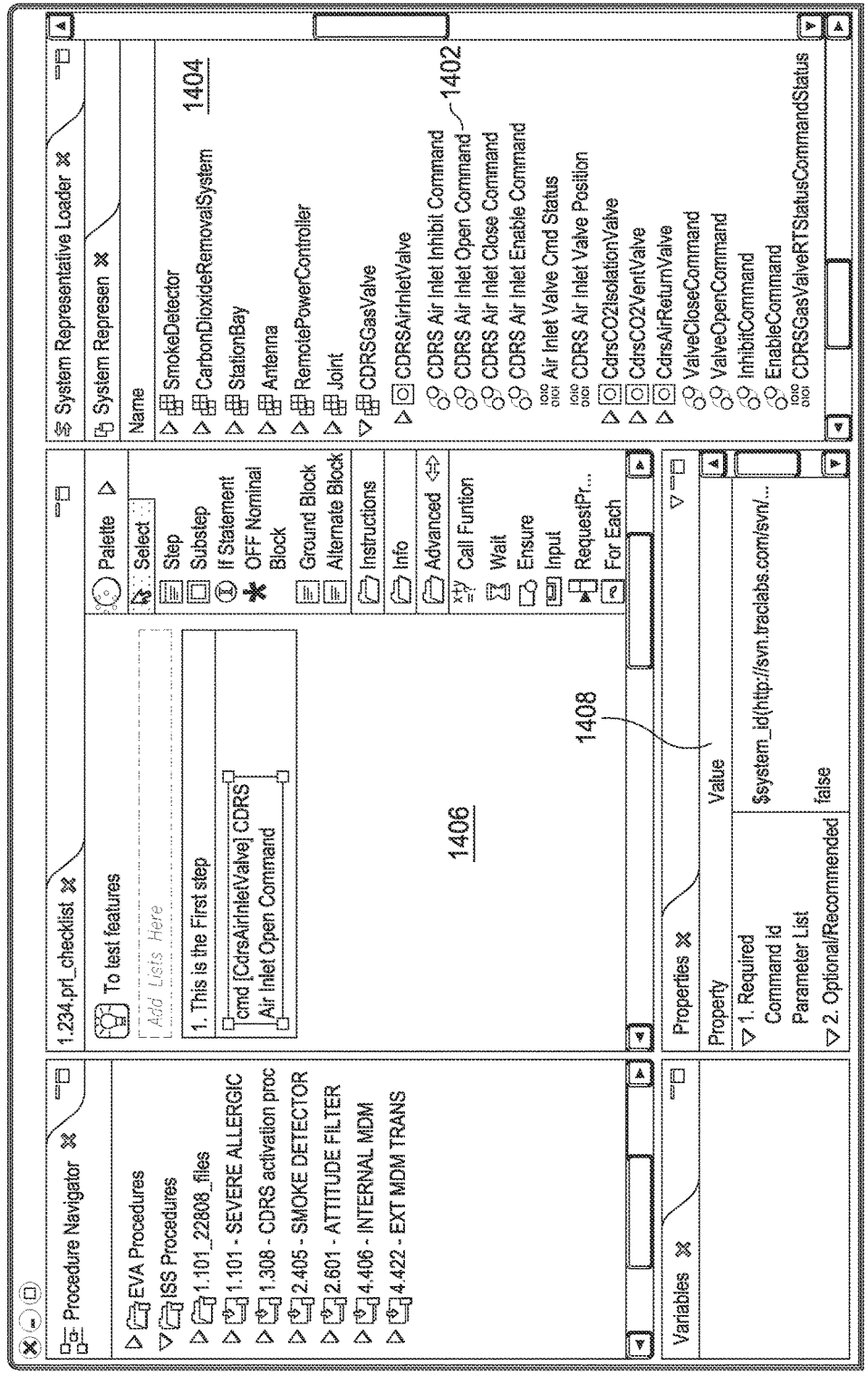
FIG. 14 illustrates insertion of a COMMAND instruction in a procedure via a procedure creation engine in accordance with various embodiments.

FIG. 14 illustrates insertion of a COMMAND instruction in a procedure via the procedure creation engine 202. In the user interface of FIG. 14, a COMMAND instruction 1402 is selected from the system definitions menu 1404, and dragged and dropped into the procedure being created in pane 1406. The parameters of the command are entered by a user in the property pane 1408. The procedure creation engine 202 may generate PRL corresponding to the COMMAND instruction as follows:

```
    <prl:CommandInstruction executionMode="automated"
        instructionIdentifier="instr5">
        <prl:Description>
            <prl:Text>cmd [CdrsAirInletValve]
            CDRS Air Inlet Open Command</prl:Text>
        </prl:Description>
        <prl:Command>
            <prl:CommandIdentifier>
                <prl:DataReference source="system_id">
    <prl:Identifier>http://svn.traclabs.com/svn/SAVH/trunk/docs/
    ontologies/nasa/nasa.owl#airInletOpenCommand</prl:Identifier>
                </prl:DataReference>
            </prl:CommandIdentifier>
        </prl:Command>
    </prl:CommandInstruction>
```

Figure 15:
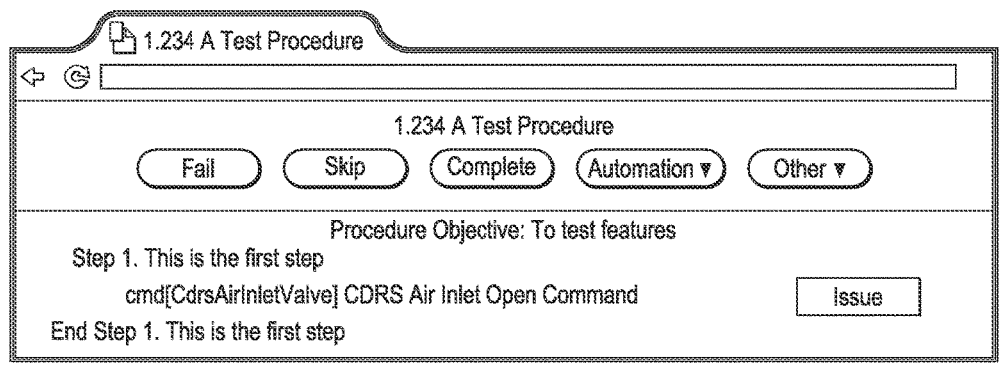
FIG. 15 shows natural language statements generated by a procedure execution engine from a procedure language COMMAND Instruction in accordance with various embodiments.

The PRL includes a path to the system interface definitions from which the command was derived. FIG. 15 shows the natural language statements generated and displayed by the procedure execution engine 204 from the COMMAND instruction PRL shown above.

Figure 16:
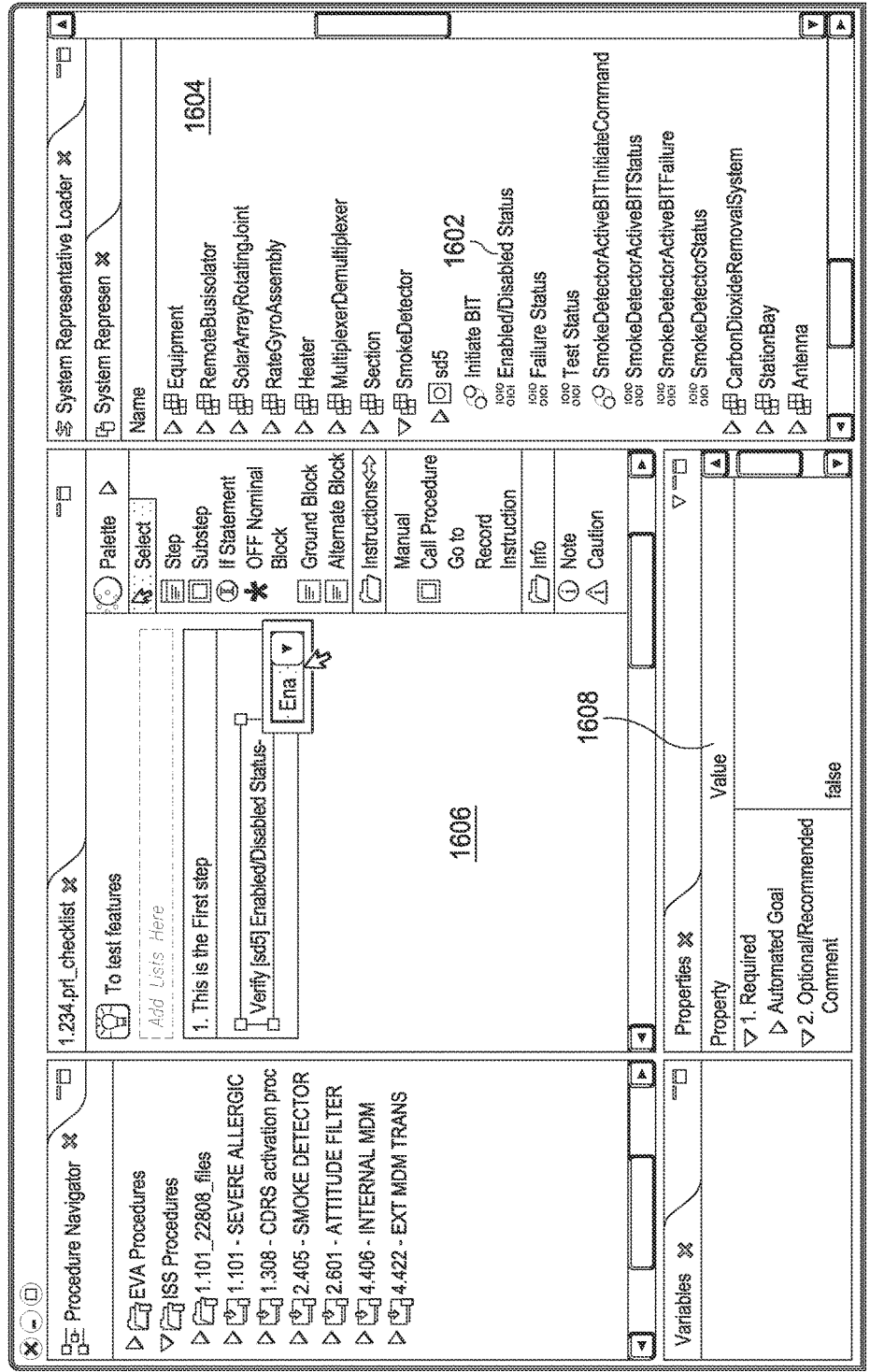
FIG. 16 illustrates insertion of a VERIFY instruction in a procedure via a procedure creation engine in accordance with various embodiments.

FIG. 16 illustrates insertion of a VERIFY instruction in a procedure via the procedure creation engine 202. In the user interface of FIG. 16, status to be verified 1602 is selected from the system interface definitions menu 1604, and dragged and dropped into the procedure being created in pane 1606. The parameters of the command are entered by a user in the property pane 1608. The procedure creation engine 202 may generate PRL corresponding to the VERIFY instruction as follows:

```
<prl:VerifyInstruction executionMode="automated"
instructionIdentifier="instr2" exitModeReference="exitFailure">
    <prl:Description>
        <prl:Text>Verify [sd5] Enabled/Disabled Status</prl:Text>
    </prl:Description>
    <prl:VerifyGoal>
        <prl:TargetDescription>
            <prl:Text>[sd5] Enabled/Disabled Status</prl:Text>
        </prl:TargetDescription>
        <prl:CurrentValue>
            <prl:DataReference dataType="enumeration" source="system_id">
<prl:Identifier>http://svn.traclabs.com/svn/SAVH/trunk/docs/
ontologies/nasa/nasa.owl#sd5status</prl:Identifier>
            </prl:DataReference>
        </prl:CurrentValue>
        <prl:Operator operator="equal"/>
        <prl:TargetValue>
            <prl:Constant dataType="enumeration">
                <prl:EnumerationValue>
                    <prl:Name>Ena</prl:Name>
                    <prl:Value>1</prl:Value>
                </prl:EnumerationValue>
            </prl:Constant>
        </prl:TargetValue>
    </prl:VerifyGoal>
</prl:VerifyInstruction>
```

Figure 17:
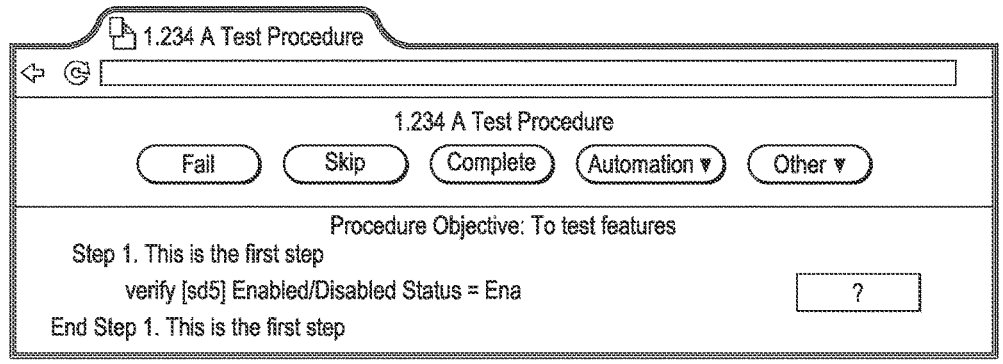
FIG. 17 shows natural language statements generated by a procedure execution engine from a procedure language VERIFY Instruction in accordance with various embodiments.

The PRL includes a path to the system interface definitions from which the status was derived. FIG. 17 shows the natural language statements generated and displayed by the procedure execution engine 204 from the VERIFY instruction PRL shown above.

Figure 18:
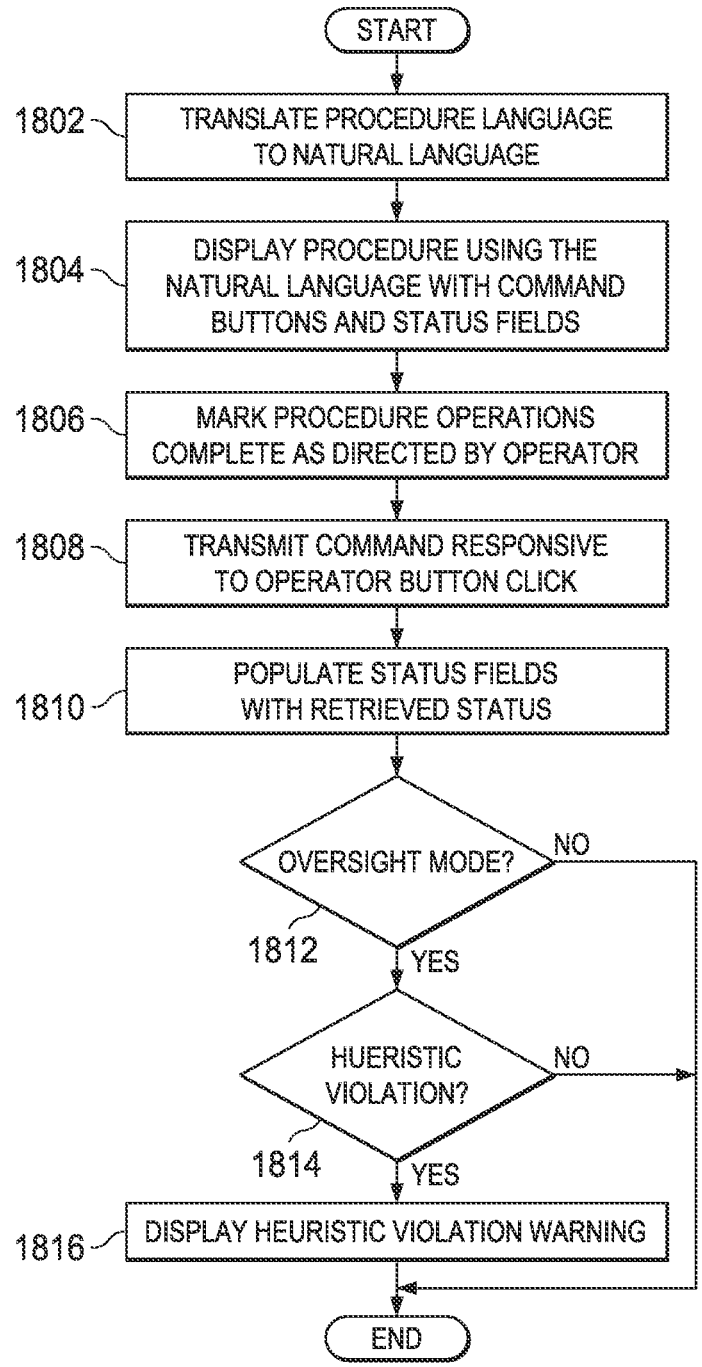
FIG. 18 shows a flow diagram for a method for manually executing a procedure in accordance with various embodiments.

FIG. 18 shows a flow diagram for a method for manually executing a procedure in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 18, as well as other operations described herein, can be implemented as instructions stored in computer readable storage medium 404 and executed by processor 402.

In block 1802, the procedure execution station 102 initiates execution of a selected procedure. The procedure is retrieved from storage, and the operations of the procedure, as recorded in procedure language, are translated into natural language statements. The translating may include generating text in natural language that communicates the operation(s) (e.g., instruction functions, parameters, etc.) encoded in the procedure language statements.

In block 1804, the procedure execution station 102 generates a user interface (e.g. a graphical user interface) including a display that shows the natural language statements. In conjunction with each natural language statement that indicates a command is to be transmitted to the target system 104, the procedure execution station 102 renders a command transmit button. In conjunction with each statement that indicates a status of the target system 104 is to be verified, the procedure execution station 102 renders a status display field for displaying a status value retrieved from the target system 104. The operations indicated by each natural language statement are manually performed by an operator until the procedure is completed. As the operations indicated in each natural language statement are performed and verified, the procedure execution station 102 marks the statement, responsive to operator direction, as having been completed in block 1806. The procedure execution station 102 may also log procedure execution, retrieved status, operator actions, etc. Information logged by the procedure execution station 102 may include operator login/logout to the procedure execution station 102, natural language statement currently being executed, procedure complete or aborted, procedure language step and instruction status (completed, skipped, failed, etc.), status values retrieved from the target system 104, etc. Timestamps, operator identity, and/or geographic location may also be logged in conjunction the above-mentioned information or other logged events.

In block 1808, the procedure execution station 102 transmits a command responsive to the operator clicking a transmit command button corresponding to a natural language statement. Thus, command transmission is manually controlled while the procedure execution station 102 provides the command transmission functionality. In block 1810, procedure execution station 102 retrieves a status value from the target system 104 and populates the displayed status field, associated with the corresponding natural language statement, with the status value.

If, in block 1812, the procedure execution station 102 is manually executing the procedure in oversight mode, then the procedure execution station 102 monitors and applies heuristics (e.g., rules of procedure execution) to the manual execution. If, in block 1814, the procedure execution station 102 detects a violation of the heuristics, then the procedure execution station 102 displays a heuristic violation warning on the user interface in block 1816. The warning may indicate the nature of the violation and may suggest a corrective action.

Figure 19:
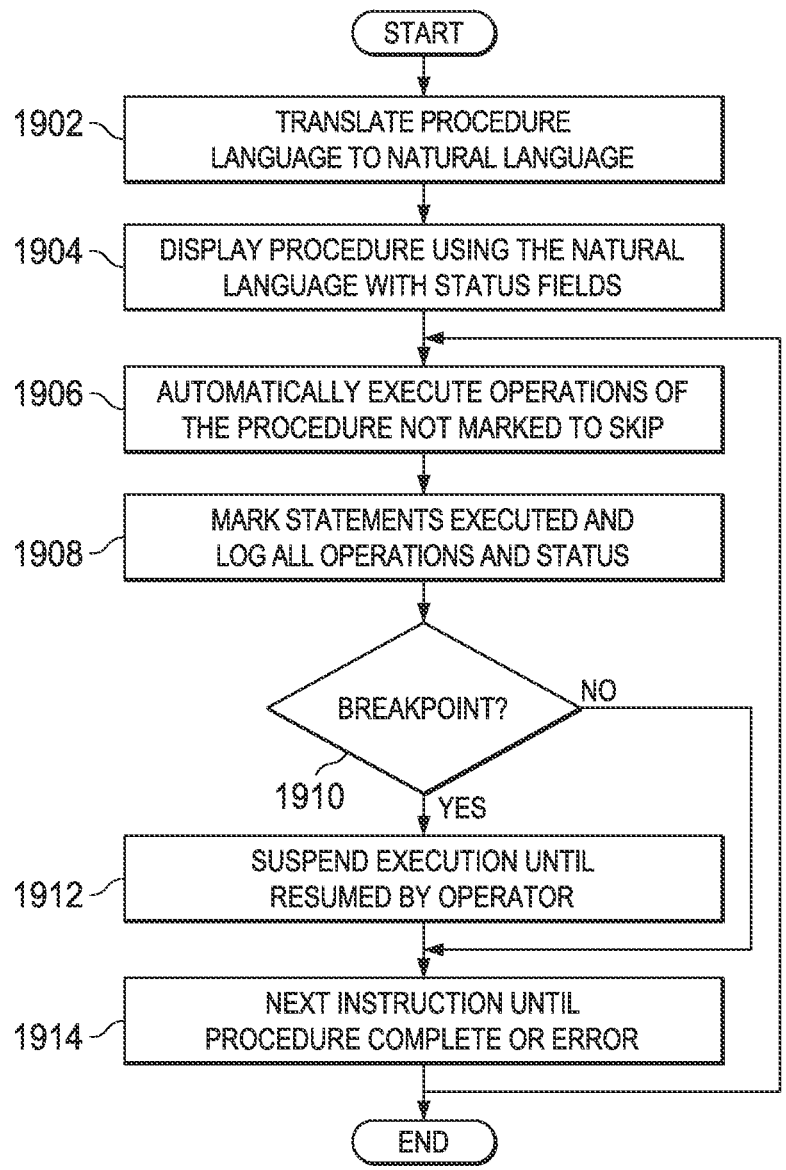
FIG. 19 shows a flow diagram for a method for automatically executing a procedure in accordance with various embodiments.

FIG. 19 shows a flow diagram for a method for automatically executing a procedure in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 19, as well as other operations described herein, can be implemented as instructions stored in computer readable storage medium 404 and executed by processor 402.

In block 1902, the procedure execution station 102 initiates execution of a selected procedure. The procedure is retrieved from storage, and the operations of the procedure, as recorded in procedure language, are translated into natural language statements. The translating may include generating text in natural language that communicates the operation(s) (e.g., instruction functions, parameters, etc.) encoded in the procedure language statements.

In block 1904, the procedure execution station 102 generates a user interface (e.g. a graphical user interface) including a display that shows the natural language statements. In conjunction with each natural language statement that indicates a status of the target system 104 is to be verified, the procedure execution station 102 renders a status display field for displaying a status value retrieved from the target system 104.

In block 1906, the procedure execution station 102 automatically executes the procedure language associated with a natural language statement, if the natural language statement has not been marked by the operator to be skipped (i.e., not executed). As the procedure language associated with a natural language statement is executed, the natural language statement is marked as executed on the user interface in block 1908. The procedure execution station 102 may also log procedure execution, retrieved status, operator actions, etc.

The procedure execution station 102 allows an operator to associate a breakpoint with a natural language statement via the user interface. If a breakpoint is encountered, in block 1910, then the procedure execution station 102 suspends execution of the procedure, in block 1912, until the operator directs resumption of procedure execution, via the user interface.

In block 1914, the procedure execution station 102 selects a next procedure language instruction for execution until the procedure is complete or an error in execution is encountered, at which time procedure execution is halted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A procedure execution engine apparatus coupled to a target system for executing a procedure defined via a procedure language, comprising:
    a hardware processor;
    a memory storing instructions, which, when executed by the hardware processor, cause the hardware processor to:
    translate instructions of the procedure to natural language statements corresponding to operations specified by the procedure language;
    generate a user interface for controlling an execution of the procedure;
    display the natural language statements on the user interface;
    receive a user input, wherein the user input indicates either a manual execution of the procedure or an automatic execution of the procedure;
    when the user input indicates the manual execution of the procedure, manually execute the instructions of the procedure, receive verification from an operator that manual operations corresponding to each displayed natural language statement have been performed, and determine whether an oversight mode is enabled;
    when the oversight mode is enabled, apply procedure execution heuristics to the manual operations corresponding to each displayed natural language statement to determine whether an executed manual operation deviates from the procedure execution heuristics;
    when the executed manual operation deviates from the procedure execution heuristics, display an annotation adjacent to a natural language statement corresponding to the executed manual operation, wherein the annotation comprises at least one of a warning or a corrective action;
    when the user input indicates the automatic execution of the procedure, automatically execute the instructions of the procedure without converting the instructions of the procedure for execution, wherein the procedure execution engine apparatus manipulates the target system according to the instructions of the procedure;
    and indicate progress of the execution of the procedure, via the user interface, based on the natural language statements displayed on the user interface.

2. The procedure execution engine apparatus of claim 1, wherein the hardware processor is further configured to:
    retrieve a status value from the target system manipulated via the procedure; and
    display the status value on the user interface in conjunction with one of the natural language statements corresponding to an instruction of the procedure language that when executed causes the retrieval of the status value.

3. The procedure execution engine apparatus of claim 1, wherein the hardware processor is further configured to:
    display, on the user interface, in conjunction with one of the natural language statements that specifies transmission of a command to the target system manipulated by the procedure, a command transmission control;
    transmit the command to the target system based on selection of the command transmission control by an operator.

4. The procedure execution engine apparatus of claim 1, wherein the hardware processor is further configured to indicate on the user interface that one of the natural language statements has been executed based on instructions of the procedure language corresponding to the natural language statement having been executed.

5. The procedure execution engine apparatus of claim 1, wherein the heuristics applied in the oversight mode relate to:
    an order of execution of the instructions of the procedure;
    an execution time of the executed manual operation; or
    an improper execution of the executed manual operation.

6. The procedure execution engine apparatus of claim 1, wherein the hardware processor is configured to:
    store information indicative of operations performed to manually execute the procedure in a procedure execution log;
    store information indicative of operations performed to automatically execute the procedure in the procedure execution log.

7. The procedure execution engine apparatus of claim 1, wherein the hardware processor is configured to:
    suspend execution of the instructions of the procedure defined by the procedure language responsive to a breakpoint being set at a natural language statement corresponding to the procedure language;

not execute the instructions of the procedure defined by the procedure language corresponding to a natural language statement selected to be skipped.

8. The procedure execution engine apparatus of claim 1, wherein the hardware processor is further configured to:

allow drag and drop authoring of the procedure in the procedure language; and provide procedure language statements that are directed to the target system to be manipulated by the procedure for dragging and dropping.

9. A method for executing a procedure defined via a procedure language to manipulate a target system, comprising:

translating, using a hardware processor, instructions of the procedure to natural language statements corresponding to operations specified by the procedure language;

generating a user interface for controlling an execution of the procedure;

displaying the natural language statements on the user interface;

receiving a user input, wherein the user input indicates either a manual execution of the procedure or an automatic execution of the procedure;

when the user input indicates the manual execution of the procedure, manually executing the instructions of the procedure, receiving verification from an operator that manual operations corresponding to each displayed natural language statement have been performed, and determining whether an oversight mode is enabled;

when the oversight mode is enabled, applying procedure execution heuristics to the manual operations corresponding to each displayed natural language statement to determine whether an executed manual operation deviates from the procedure execution heuristics;

when the executed manual operation deviates from the procedure execution heuristics, displaying an annotation adjacent to a natural language statement corresponding to the executed manual operation, wherein the annotation comprises at least one of a warning or a corrective action;

when the user input indicates the automatic execution of the procedure, automatically executing, using the hardware processor, the instructions of the procedure without converting the instructions of the procedure for execution, wherein the hardware processor manipulates the target system according to the instructions of the procedure; and showing progress of the execution of the procedure, via the user interface, by indicating which of the displayed natural language statements have been executed.

10. The method of claim 9, further comprising:

retrieving a status value from the target system manipulated via the procedure;

and displaying the status value on the user interface in conjunction with one of the natural language statements responsive to execution of an instruction of the procedure language that retrieves the status value;

wherein the one of the natural language statements corresponds to a procedure language instruction of the procedure that retrieves the status value.

11. The method of claim 9, further comprising:

displaying, on the user interface, in conjunction with one of the natural language statements that specifies transmission of a command to the target system manipulated by the procedure, a command transmission control;

transmitting the command to the target system based on selection of the command transmission control by the operator.

12. The method of claim 9, further comprising indicating on the user interface that one of the natural language statements has been executed based upon completing execution of procedure language instructions of the procedure that correspond to the natural language statement.

13. The method of claim 9, further comprising:

applying procedure execution rules to the manual operations;

determining whether manually executed natural language statements are executed in accordance with the rules;

and providing information to the operator indicating a potential violation of the rules based on the determining.

14. The method of claim 9, further comprising:

recording, in a procedure execution log, procedure execution information indicative of operations performed to manually execute the procedure; and recording, in the procedure execution log, procedure execution information indicative of operations performed to automatically execute the procedure.

15. The method of claim 9, further comprising:

halting execution of procedure language instructions responsive to a breakpoint being set at a natural language statement corresponding to the procedure language instructions;

forgoing execution of procedure language instructions corresponding to a natural language statement selected to be skipped.

16. A non-transitory computer-readable medium encoded with instructions that when executed cause a hardware processor to:

translate a procedure defined via a procedure language to natural language statements corresponding to operations specified by the procedure language;

generate a user interface for controlling an execution of the procedure;

display the natural language statements on the user interface;

receive a user input, wherein the user input indicates either a manual execution of the procedure or an automatic execution of the procedure;

when the user input indicates the manual execution of the procedure, manually execute instructions of the procedure, receive verification from an operator that manual operations corresponding to each displayed natural language statement have been performed, and determine whether an oversight mode is enabled;

when the oversight mode is enabled, apply procedure execution heuristics to the manual operations corresponding to each displayed natural language statement to determine whether an executed manual operation deviates from the procedure execution heuristics;

when the executed manual operation deviates from the procedure execution heuristics, display an annotation adjacent to a natural language statement corresponding to the executed manual operation, wherein the annotation comprises at least one of a warning or a corrective action;

when the user input indicates the automatic execution of the procedure, automatically execute, using the hardware processor, the instructions of the procedure without converting the instructions of the procedure for execution, wherein the hardware processor manipulates a target system according to the instructions of the procedure; and indicate progress of the execution of the procedure, via the user interface, based on the natural language statements displayed on the user interface.

17. The non-transitory computer-readable medium of claim 16, encoded with instructions that when executed cause the hardware processor to:

retrieve a status value from the target system manipulated via the procedure; and display the status value on the user interface in conjunction with one of the natural language statements corresponding to an instruction of the procedure language that when executed causes the retrieval of the status value.

18. The non-transitory computer-readable medium of claim 16, encoded with instructions that when executed cause the hardware processor to:

display, on the user interface, in conjunction with one of the natural language statements that specifies transmission of a command to the target system manipulated by the procedure, a command transmission control;

transmit the command to the target system based on selection of the command transmission control.

19. The non-transitory computer-readable medium of claim 16, encoded with instructions that when executed cause the hardware processor to indicate on the user interface that one of the natural language statements has been executed based on instructions of the procedure language corresponding to the natural language statement having been executed.

20. The non-transitory computer-readable medium of claim 16, encoded with instructions that when executed cause the hardware processor to:

apply procedure execution heuristics to the manual operations;

and provide information to the operator based on the manual operations deviating from the heuristics.

21. The non-transitory computer-readable medium of claim 16, encoded with instructions that when executed cause the hardware processor to:

store information indicative of operations performed to manually execute the procedure in a procedure execution log;

store information indicative of operations performed to automatically execute the procedure in the procedure execution log.

22. The non-transitory computer-readable medium of claim 16, encoded with instructions that when executed cause the hardware processor to:

suspend execution of the instructions of the procedure language responsive to a breakpoint being set at a natural language statement corresponding to the procedure language;

not execute the instructions of the procedure language corresponding to a natural language statement selected to be skipped.

23. The procedure execution engine apparatus of claim 1, wherein the procedure language is a procedure representation language (PRL).

24. The method of claim 9, wherein the procedure language is a procedure representation language (PRL).

25. The non-transitory computer-readable medium of claim 16, wherein the procedure language is a procedure representation language (PRL).

* * * * *